United States Patent [19]
Augustine et al.

[11] 3,859,660
[45] Jan. 7, 1975

[54] DOPPLER RADAR FOR LAND VEHICLES

[75] Inventors: Carroll F. Augustine, Farmington; Raymond E. Anderson, Dearborn Heights, both of Mich.

[73] Assignee: Midwest Microwave, Inc., Ann Arbor, Mich.

[22] Filed: Feb. 14, 1972

[21] Appl. No.: 226,108

[52] U.S. Cl. ............................... 343/9, 343/8
[51] Int. Cl. ....................... G01s 9/46, G01s 9/04
[58] Field of Search ...................... 343/8, 9, 7 ED

[56] References Cited
UNITED STATES PATENTS

| | | | |
|---|---|---|---|
| 3,118,139 | 1/1964 | Durstewitz | 343/8 |
| 3,140,486 | 7/1964 | Gillmer | 343/8 |
| 3,242,486 | 3/1966 | Corbell | 343/5 PD |
| 3,243,807 | 3/1966 | Balsiger | 343/8 |
| 3,371,341 | 2/1968 | Stavis | 343/9 |
| 3,480,954 | 11/1969 | Gray et al. | 343/9 |
| 3,618,084 | 11/1971 | Balsiger et al. | 343/8 |
| 3,663,932 | 5/1972 | Mount | 343/9 |

Primary Examiner—Maynard R. Wilbur
Assistant Examiner—H. A. Birmiel
Attorney, Agent, or Firm—Harness, Dickey & Pierce

[57] ABSTRACT

A doppler radar system for automobiles and the like which is especially adapted for measuring vehicle speed. Preferably two radar antennas are utilized, one of which is forwardly and downwardly directed and the other of which is rearwardly and downwardly directed. The doppler signals from each of the antennas are summed to provide a velocity signal which is compensated for changes in the pitch of the vehicle. The system incorporates a circuit for distinguishing between phase shifts due to vertical vibratory motions of the vehicle when the vehicle is not moving longitudinally along the traveling surface and doppler shifts when the vehicle is moving longitudinally so that the system is only responsive to the doppler shifts.

2 Claims, 6 Drawing Figures

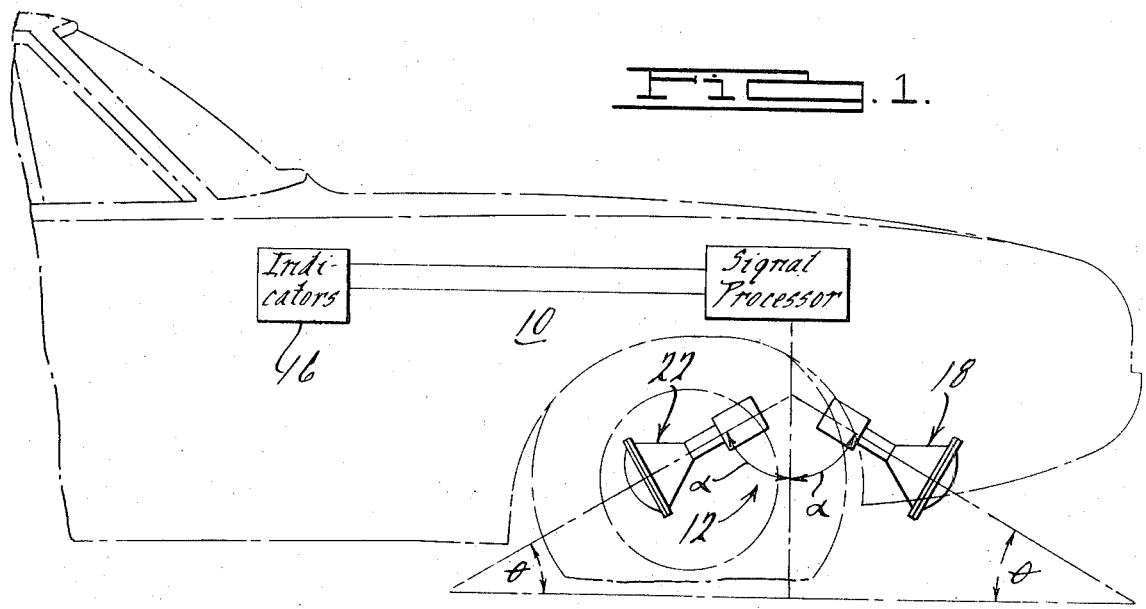
FIG. 1.
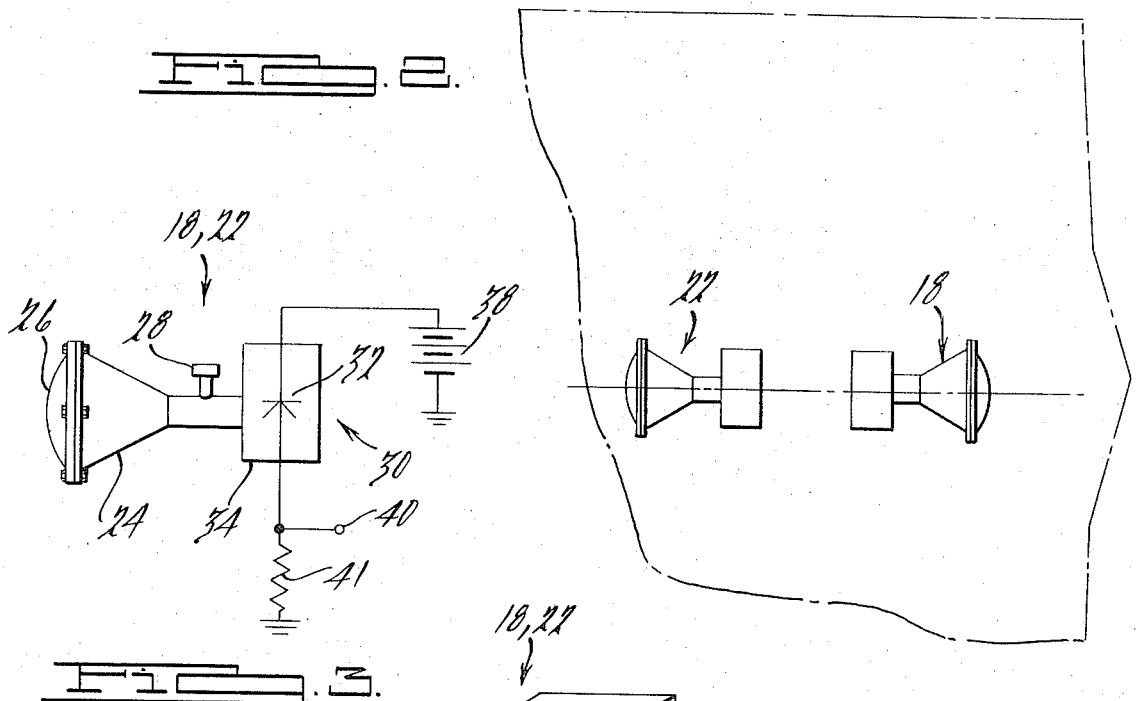
FIG. 2.
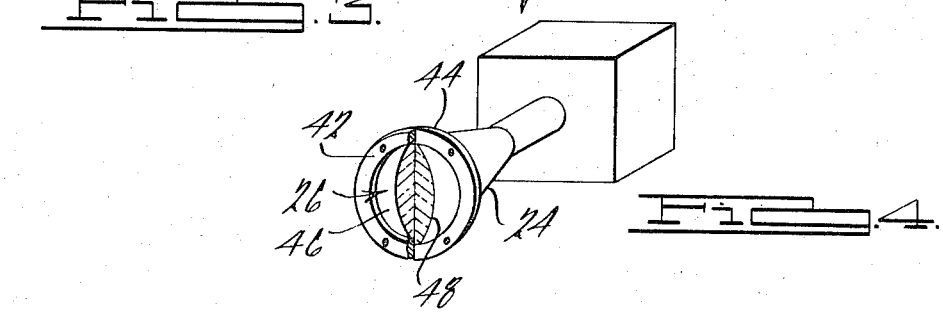
FIG. 3.
FIG. 4.

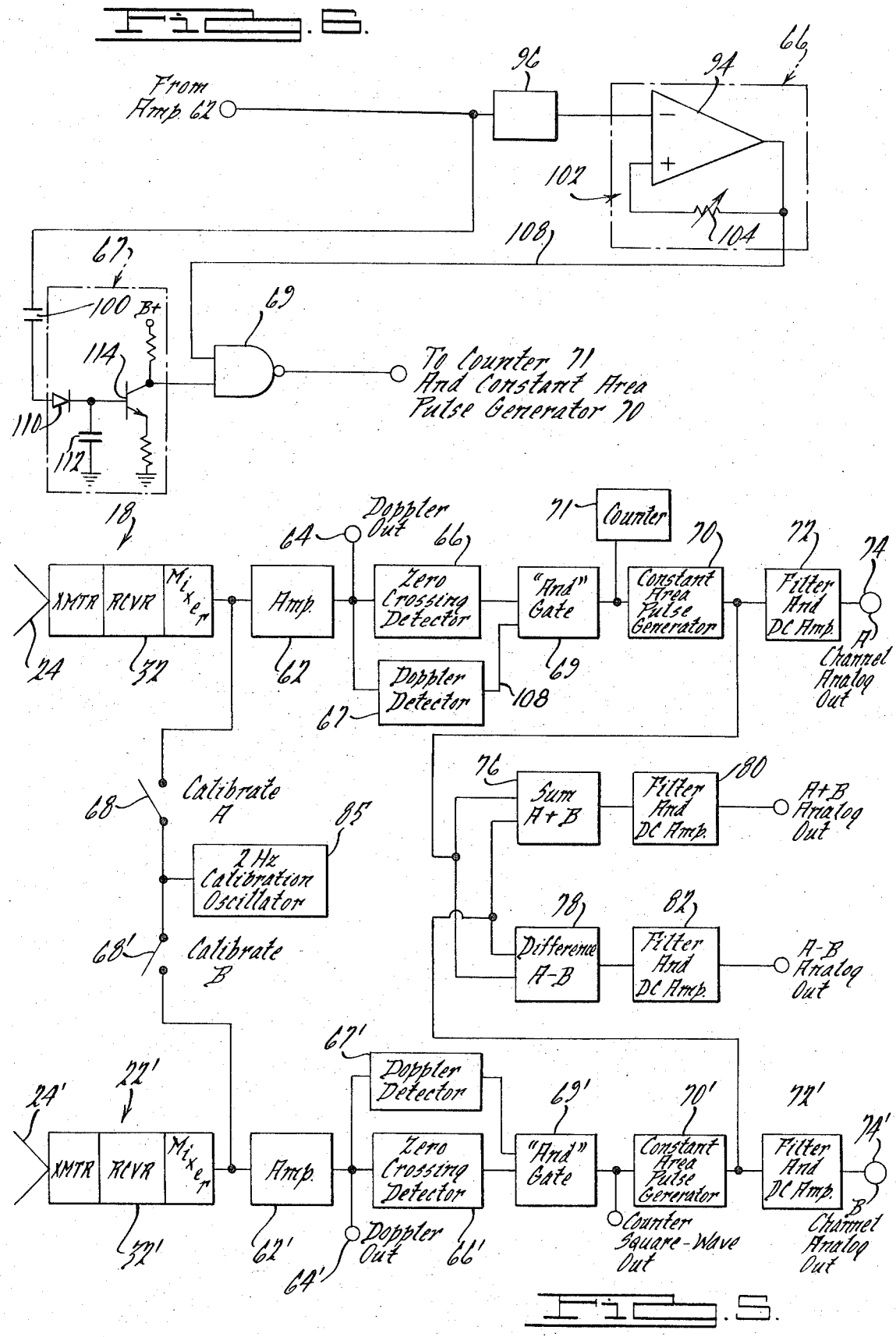

DOPPLER RADAR FOR LAND VEHICLES

BACKGROUND AND SUMMARY OF THE INVENTION

The present invention relates to improvements in velocity sensing doppler radar systems for land vehicles. In an exemplary system according to the present invention, a pair of receiving/transmitting antennas are used, one of which is forwardly and downwardly directed along the longitudinal axis of the vehicle and the other of which is rearwardly and downwardly directed along the longitudinal axis of the vehicle. The downward inclination of each of the antennas is established so that equal angles are formed with the traveling surface when the longitudinal axis of the vehicle is parallel to the traveling surface. Each antenna is associated with a microwave source for generating microwave energy and a mixer which mixes generated energy with energy reflected from a traveling surface for providing a signal representative of the doppler frequency consequent movement of the vehicle along the traveling surface. Preferably, a single diode is used to generate microwave energy for transmission from the antenna and to mix received energy to provide a signal representative of the doppler effect. The signals from each antenna are summed so as to automatically compensate for changes in pitch attitude of the vehicle. If desired, a pair of antennas may be laterally divergently directed with respect to the longitudinal axis of the vehicle to indicate vehicle drift.

Each antenna is focused at the road surface for improving the quality of the doppler signal. Preferably, each antenna is focused using a dielectric lens of high impact-resistance plastic material which provides a sturdy enclosing face for the antenna structure.

Under some conditions, a vehicle having no longitudinal movement will have sufficient vertical oscillations due to engine vibrations and the like so as to change the distance between the antenna and the traveling surface thereby causing a varying phase shift between the transmitted and received microwave signal which may appear like a doppler signal to a frequency measuring system using a zero crossing detector. Consequently, such a doppler system will respond to the apparent doppler phase shift so as to indicate a vehicle velocity while in fact the vehicle has no longitudinal movement. The present invention provides a circuit for distinguishing between a varying phase shift due to vertical vibratory motions of the vehicle when not moving longitudinally and true doppler shift when the vehicle is in motion to prevent the generation of a false longitudinal movement signal.

BRIEF DESCRIPTION OF THE DRAWINGS

FIG. 1 is a side view of a vehicle mounted radar system having a forwardly directed antenna and an aftwardly directed antenna;

FIG. 2 is a top view of part of the system of FIG. 1 further illustrating the forwardly and aftwardly directed antennas;

FIG. 3 is a partially schematic illustration of a single diode doppler radar sub-system for use in the system of FIG. 1;

FIG. 4 is a first illustration of an antenna structure having a lens system for use in the system of FIG. 1;

FIG. 5 is a block diagram of the processing circuit of a doppler radar system for a vehicle which provides a velocity output signal and distance traveled output signal; and FIG. 6 is a circuit diagram of a circuit for distinguishing between a signal representative of phase shifts caused by vertical motions of a vehicle at rest from a signal representative of doppler shift caused by a longitudinal motion of the land vehicle along its traveling surface.

DETAILED DESCRIPTION OF THE PREFERRED EMBODIMENTS

In FIGS. 1 and 2, an exemplary embodiment of a land vehicle doppler radar system 10 is illustrated for measuring vehicle speed and distance traveled. The system 10 includes an antenna system 12, a signal processing module 14, and a velocity and distance traveled indicating unit 16. The antenna system 12 includes a forwardly directed antenna unit 18 and an aftwardly directed antenna unit 22 with each antenna unit being disposed along a longitudinal axis of the vehicle, for example, the central axis of the vehicle. As can be best seen in FIG. 1, the axes of transmission/reception of each the forwardly looking antenna unit 18 and the aftwardly looking antenna unit 22 is directed at an angle $\alpha$ with respect to a vertical axis of the vehicle. Consequently, when the longitudinal axis of the vehicle is parallel to the traveling surface, a complementary angle $\theta$ exists between the axis of transmission/reception of each antenna unit 18 and 22 and the traveling surface.

In FIG. 3, a basic doppler antenna unit 18 or 22 is seen to comprise a horn structure 24 having a lens 26, a tuning stub 28, and microwave generating/receiving/mixing circuit 30. Each of the microwave generating/receiving/mixing circuits 30 preferably has a single diode 32 which is connected to a source 38 of potential which is adjusted so that the diode 32 oscillates in the microwave range. The diode 32 is located in a resonant cavity 34 for establishing the basic frequency of resonance. The resonant cavity 34 has a window or opening connecting the horn structure 24 to the cavity 34 so that at least a portion of the microwave energy within the cavity 34 is delivered to the horn structure 24 to be radiated from the horn 24. It will also be appreciated that various forms of microwave generating and mixing structures can be used including a single generating source for both antennas, or a separate source and separate mixer for each antenna.

The horn 24 is directed at a suitable traveling surface as shown in FIGS. 1 and 2. In this regard, a suitable surface is one having sufficient surface irregularities or projections so that a portion of the radiated microwave energy will be reflected to the horn antenna and delivered to the cavity 34 which is sufficient to affect one or more operating conditions of the diode 32 in accordance with a doppler shift in the received microwave energy caused by relative motion between the antenna unit 18 or 22 and the traveling surface. The types of diodes performing the above generating/receiving/mixing operation are known in this art, one of which being described in the patent to Stephens, Jr., U.S. Pat. No. 3,383,682, issued May 14, 1968. The diode may be a tunnel diode as described in the above patent, a gun diode, an avalanche diode, or other suitable solid state structure.

By way of illustration, the variation in the operating characteristic of the diode 32 which is indicative of the doppler frequency may be a variation in current through the diode at the doppler frequency which is detectable at a terminal 40 which is connected between the diode 32 and a resistor 41 which is in turn connected to ground.

In FIG. 4, the form of the horn 24 and the lens 26 can be best seen. The horn 24 is a frustoconical structure with a circular dielectric lens structure 26 mounted at the enlarged end opening thereof by flanges 42 and 44 which are held in sealing, clamping engagement with the lens 26 by suitable bolts as shown. The lens structure 26 is constructed of a non-hydroscopic plastic material of high-impact strength such as of a polystyrene known as "Rexolite." It can be seen that the lens structure 26 protects the internal components of the antenna unit 18 or 22 from damage due to flying objects, and additionally, the sealing engagement between the lens structure 26 and the horn 24 weatherproofs the antenna unit 18 or 22. The lens structure has a forward focal length which is substantially equal to the distance between the lens and the road surface so that the microwave energy transmitted through the lens structure 26 is focused on the roadway. The lens structure 26 has a rearward focal length which is substantially equal to the distance beetweeen the lens 26 and the microwave source/receiver/mixing structure comprising the diode 32 and the cavity 34. Consequently, microwave energy emitted from the limited location of the source/receiver/mixer structure is colimated and focused at the lens so as to be concentrated into a restricted area at the traveling surface at the intersection of the axis of transmission/reception of the antenna unit 18 or 22. In practice, the area of microwave illumination on the roadway is elliptical with the major axis being longitudinally aligned.

In FIG. 5, a block diagram of the system 10 is illustrated. The antenna unit 18 is illustrated as having an antenna horn 24 and a transmitting/receiving/mixing diode 32 as previously described. The output of the diode 32, which is representative of the doppler frequency resulting from movement of the vehicle, is supplied to an amplifier 62 of process channel A. If desired, the doppler signal output from the amplifier 62 may be directly read at a terminal 64 provided for that purpose. The input of the amplifier 62 is also connected to a calibration switch 68 which is ordinarily in the open position as shown in FIG. 6. The switch 68 is adapted to close to connect the input of the amplifier 62 to a 2 kilohertz calibration oscillator 85. The amplifier 62 is delivered to a zero-crossing detector 66 and a doppler detector 67. The zero-crossing detector 66 converts the irregular alternating polarity wave from the amplifier 62 to a square wave having pulses which are initiated upon the predetermined polarity change, i.e., positive to negative or negative to positive, of the signal from the amplifier 62, and which are terminated upon the opposite polarity change. The doppler detector 67 is responsive to the amplitude of the output signals from the amplifier 62 so as to provide a doppler detector signal when the amplitude of the output signal from the amplifier 62 is significantly great so as to indicate a true doppler effect sensed at the antenna 24. The outputs from the zero-crossing detector 66 and the doppler detector 67 are delivered to an AND gate 69 which provides a pulse correlative to each pulse from the zero-crossing detector so long as the doppler detector indicates that a signal of doppler amplitude is present. The pulses from the AND gate 69 are received and counted by a digital counter 71 to yield an odometer reading indicating the distance traveled by the vehicle. The pulses from the AND gate 69 are also delivered to a constant area pulse generator 70 which generates pulses of constant width and height which correspond in number and occurrence to the square wave pulses from the zero-crossing detector 66. The constant area pulse generator output may optionally be delivered to a low pass filter and DC amplifier 72 which effectively integrates the pulses to provide a signal at terminal 74 representative of the rate or frequency of occurrence of the pulses which is in turn representative of the doppler frequency. It will be appreciated that the doppler frequency at terminal 74 is representative only of the doppler signal at the forwardly directed antenna unit 18.

The rearwardly directed antenna unit 22 is seen to comprise a horn 24' and a transmitting/receiving/mixing diode 32' as previously described. A channel B for the doppler signal received at the rearwardly directed antenna unit is provided with a calibration switch 68', connected to the calibration oscillator 85, an amplifier 62, a doppler output terminal 64', a zero-crossing detector 66', a doppler detector 67', and AND gate 69', a constant area pulse generator 70', a low frequency filter and DC amplifier 72' and an analogue output terminal 74', all having a function like the correspondingly numbered components of channel A.

The output of the constant area pulse generator 70 for the forwardly directed antenna unit is delivered to one input terminal of a summing amplifier 76 and one input terminal of a differencing amplifier 78. The output of the constant area pulse generator 70' for the rearwardly directed antenna unit is delivered to the other input terminal of the summing amplifier 76 and the other input terminal of the differencing amplifier 78. The output of the summing amplifier 76 includes the amplitude and width content of the pulses from both the constant area pulse generators 70 and 70' while the output from the differencing amplifier 78 represents the difference in amplitude and width content of the pulses from both the constant area pulse generators 70 and 70'. The output from the summing amplifier 76 and the differencing amplifier 78 are integrated by low frequency filters and DC amplifiers 80 and 82, respectively. The output of the low pass filter and DC amplifier 80 is delivered to an ammeter 84 which provides an output indication representative of the combined rates of occurrence of pulses from the zero-crossing detector 66 and 66' which in turn is representative of the sum of the doppler frequencies received at antenna units 18 and 22. As will be apparent below, this signal is representative of the velocity of the vehicle and is compensated for changes in the pitch attitude of the vehicle.

The calibration oscillator 85 is connectable to the amplifiers 62 and 62' by calibration switches 68 and 68', respectively. The calibration oscillator 85 provides a reference frequency, for example, 2,000 hertz which represents a particular speed to which the output meter 84 is adjusted when the calibration oscillator 85 is connected to the zero-crossing detectors 66 and 66'.

As will also be apparent below, the signal from low pass filter and DC amplifier 82 is representative of the angle of pitch of the vehicle.

With regard now to the operation of the system 10, the frequency of the doppler shift Fd may be given as:

$$Fd = 2v/\lambda \cos \theta$$

where $v$ is the vehicle velocity, $\lambda$ is the wave length of the radiated signal and $\theta$ is the angle between the axis of transmission reception and the traveling surface. Similarly, the total number of cycles C of doppler shifted in any distance $d$ is given by:

$$C = 2d/\lambda \cos \theta$$

For example, utilizing a radiated signal of 18 gigahertz and an angle $\theta$ of 45°, Fd equals 37.5 Hz for each mile per hour of vehicle speed, and C is equal to approximately 137,000 counts per mile.

Considering now the system 10 using a pair of antenna units, i.e., a forwardly directed antenna unit 18 and a rearwardly directed antenna unit 22, and recalling that the angles of the two antenna units are initially adjusted so that their axes of transmission/reception form equal angles $\theta$ with the road surface when the vehicle longitudinal axis is parallel with the road surface, the tilt of the vehicle through some small angle $\Delta$ results in the addition of the angle $\Delta$ to the pointing angle of one antenna unit and a subtraction of the angle $\Delta$ from the pointing angle of the other antenna unit. By adding the output of the two systems at the summing amplifier 76, the following function is peformed to yield a combined output at Fc+:

$$Fc+ = 2v/\lambda \cos (\theta + \Delta) + 2v/\lambda \cos (\theta - \Delta)$$

or:

$$Fc+ = 2v/\lambda [\cos \theta \cos \Delta - \sin \theta \sin \Delta + \cos \theta \cos \Delta + \sin \theta \sin \Delta]$$

and $$Fc+ = 2v/\lambda [(2 \cos \theta) \cos \Delta]$$

Since cosine $\Delta$ is approximately unity for small angles, it is clear from the above equation that the effect of small changes in the angle of the vehicle longitudinal axis is greatly reduced when the output of the two antenna units 18 and 22 are added.

In the subtraction of the two outputs at the differencing amplifier 78, the following operation occurs:

$$Fc- = 2v/\lambda \cos (\theta + \Delta) - 2v/\lambda \cos (\theta - \Delta)$$

and $$Fc- = 2v/\lambda [(2 \cos \theta) \sin \Delta]$$

It can be seen that Equation 4 can be readily solved for sine $\Delta$. Since sine $\Delta$ is approximately equal to $\Delta$ small angles, a measurement of it is readily obtained through the subtraction process.

In FIG. 6, a circuit diagram is provided of an exemplary doppler detector circuit 67, zero-crossing detector 66 and AND gate 69. More particularly, the zero-crossing detector 66 includes a differential operational amplifier 94 which receives the output from the amplifier 62 at its differencing terminal via a high pass filter 96.

The low frequency filter 96 passes only those frequencies which are sufficiently high so as to be within the range of doppler signals. In this regard, vertical motions of the vehicle while moving longitudinally create low frequency signals which are superimposed on the higher frequency doppler signals. The amplitude of these low frequency signals may be sufficiently large so that the doppler signal is shifted above or below the zero reference point so that one or more doppler cycles may occur without the occurrence of a zero crossing. Consequently, the low frequency filter 96 blocks the low frequency signals due to vertical motions of the car while moving longitudinally so that the doppler signals are not offset from the zero reference level to a degree which would result in undetected doppler cycles. The output of the amplifier 62 is also delivered to the doppler detector 67 via a D/C blocking capacitor 100. The differential amplifier 94 has a feedback circuit 102 connected between its output and its summing input terminal which includes a variable resistor 104 for adjusting the amount of feedback from the output to the summing input of the operational amplifier 94. The output of the differential operational amplifier 94 is connected to one input terminal of an AND gate by line 108 while the output of the doppler detector 67 is connected to the other input terminal of the AND gate 69. The output of the AND gate 69 is connected to the counter 71 and to the constant area pulse generator 70.

Zero crossing detector 66 is provided with a certain degree of response "hystersis" so that high frequency noise passed by the filter 96, which is found to have amplitudes which are lower than a predetermined threshold is not capable of causing a change in the output of the zero crossing detector 66. More specifically, the positive feedback signal at the differential operational amplifier 94 established by the adjustment of the resistor 104 of the feedback circuit 102 opposes a change in the output of the differential operational amplifier 94 so as to prevent the differential operational amplifier 94 from responding to input signals at its differencing terminal which have amplitudes which are less than a preselected amplitude. The preselected amplitude is distinctly intermediate noise amplitudes and the signal amplitudes resulting from continuing phase shifts due to the doppler effect. Once a signal of a greater amplitude than the threshold is received, the differential operational amplifier 94 will switch between full positive and full negative saturation in accordance with the doppler frequency. The output will be maintained at its maximum negative or positive level by the feedback circuit 102 until a signal of sufficient strength is received at its differencing input to drive the differential operational amplifier 94 to saturation with its output at the opposite polarity. In the absence of a doppler signal from input amplifier 62, no signal is provided on line 108 which is converted to one terminal of the AND gate 69. Consequently, in the absence of a doppler signal from input amplifier 62, no output from the AND gate 69 to the pulse generator 70 is possible. However, when a signal of sufficient amplitude so as to be identifiable as a doppler signal as opposed to noise is received at the differential operational amplifier 94, a signal is provided on line 108 so as to allow the transmission of a suitable signal from AND gate 69.

The signal from the diode 32 can be representative of either a continuing phase shift due to the doppler effect created by relative motion between the antenna unit 18 or 22 and the traveling surface, or it may be representative of a varying phase shift due to cyclic changes in the return path length between the antenna unit and the traveling surface due to vertical oscillations of the vehicle caused by engine vibrations or the like. Since the most practical way to determine a doppler shift is to detect zero-crossings of the doppler signal as by a zero-crossing detector 66, it will be seen that confusion may exist regarding zero-crossings caused by the continuous doppler phase shifts and zero-crossing caused by the alternating phase shifts due to changes in the return path length. When the vehicle is in motion, the alternating phase shifts due to vertical motions of the vehicle are of no consequence since they are overridden by the continuous doppler phase shifts, i.e., changes in the return path length may delay or hasten the occurrence of a zero-crossing due to a doppler shift, but will not substantially change the total number of zero-crossing signals representative of the rate of the occurrence of zero-crossings. However, when the vehicle is at rest the alternating phase shifts due to variation in return path length do result in recordable zero-crossings which provide a false velocity and odometer indication. This indication, as a practical matter, is especially distinctive since observers can clearly see the indication while obviously the vehicle is not moving. It has been discovered that the amplitude of the waveform due to changes in return path is significantly less than the amplitudes of the waveform representative of a true doppler shift. The doppler detector circuit 67 discriminates between these signals by being responsive to the amplitudes of the two signals. More specifically, the doppler detector 67 includes a diode 110 which receives the doppler signals from amplifier 62. The doppler signals from the amplifier 62 are generally sinosoidal in nature so that the diode 110 provides half waves at its cathode. The half waves are integrated by a capacitor 112 whereby pulses of a predetermined amplitude over a given time period charge the capacitor 112 to a potential which is sufficient to turn on a transistor 114. When the transistor 114 conducts, a signal is supplied to the AND gate 69 which allows the doppler signals on line 108 to be transmitted through to the counter 71 and the constant area pulse generator 70. Preferably, the capacitor 112 has sufficient capacity to hold the transistor 114 in a conducting state even in the absence of a few doppler signals.

It will be appreciated from the above that the present invention provides means for distinguishing the true doppler signal from other signals and effects such as high frequency noise, low frequency high amplitude signals due to vertical motions of the vehicle while moving longitudinally, and low frequency low amplitude signals due to vertical motions of the vehicle when at rest longitudinally. Consequently, exceptionally accurate and reliable indications of velocity and distanced-traveled are provided.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

We claim:

1. In combination with a land vehicle traveling longitudinally along a roadway for the land vehicle, a system comprising:

generating and doppler detecting means for generating high frequency electromagnetic energy and for providing a signal representative of a phase shift between a returned part of said high frequency energy and a generated part of said high frequency energy;

directing and receiving means directing at least a portion of said generated energy along an axis intersecting with said roadway and receiving along said axis a returned part of said generated energy directed along said axis; and signal processing means receiving said signal including means responsive to the amplitude of said signal for distinguishing between one portion of said signal representative of phase shifts due to a doppler effect and another portion of said signal due to another effect, said distinguishing means including doppler responsive means having an input means, an output means providing an output signal, and a feedback means connected between said input means and said output means for providing a feedback signal, said input means being connected to receive said signal and said feedback signal, said feedback signal being provided in opposition to said signal whereby a signal of predetermined amplitude at said input is required to effect a predetermined change in said output signal, and said distinguishing means further including an AND means having a pair of inputs and an output for providing an output signal in accordance with predetermined signals at both of said inputs, said signal being connected to one of said AND means input and said output signal of said doppler responsive means being connected to said other input of said AND means whereby the receipt by said AND means of both said output signal from said doppler responsive means and said signal provides an output from said AND means which is representative of phase shifts due to a doppler effect consequent longitudinal movement of said land vehicle.

2. A system according to claim 1 wherein said other portion of said signal is due to vertical motions of said vehicle.

* * * * *